(12) United States Patent
Machida et al.

(10) Patent No.: US 10,216,179 B2
(45) Date of Patent: Feb. 26, 2019

(54) MONITORING CONTROL SYSTEM AND WORK SUPPORT METHOD

(71) Applicant: Yokogawa Electric Corporation, Tokyo (JP)

(72) Inventors: Yuta Machida, Tokyo (JP); Makoto Nakaya, Tokyo (JP); Hiromi Amii, Tokyo (JP); Naoto Takano, Tokyo (JP); Yuya Iketsuki, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 77 days.

(21) Appl. No.: 15/389,932

(22) Filed: Dec. 23, 2016

(65) Prior Publication Data

US 2017/0205819 A1 Jul. 20, 2017

(30) Foreign Application Priority Data

Jan. 15, 2016 (JP) ................. 2016-006086

(51) Int. Cl.
*G05B 15/02* (2006.01)
*G05B 23/02* (2006.01)

(52) U.S. Cl.
CPC ..... *G05B 23/0291* (2013.01); *G05B 23/0216* (2013.01)

(58) Field of Classification Search
CPC ............................................... G05B 23/0291
See application file for complete search history.

(56) References Cited

U.S. PATENT DOCUMENTS

| | | | | |
|---|---|---|---|---|
| 4,042,813 A | * | 8/1977 | Johnson ............... | G09B 9/00 376/217 |
| 4,440,715 A | * | 4/1984 | Sato ..................... | G21D 1/04 376/210 |
| 4,616,216 A | * | 10/1986 | Meirow ............... | H01H 9/167 340/500 |
| 5,028,378 A | * | 7/1991 | Wachholz ............ | G21C 9/02 376/216 |
| 5,227,122 A | * | 7/1993 | Scarola ............... | G21C 17/00 376/259 |
| 5,263,061 A | * | 11/1993 | Lamuro ............... | G21C 13/00 165/53 |
| 5,422,808 A | * | 6/1995 | Catanese, Jr. ...... | G05B 19/4063 307/132 E |

(Continued)

FOREIGN PATENT DOCUMENTS

| | | |
|---|---|---|
| JP | 9-230927 A | 9/1997 |
| JP | 10-97317 A | 4/1998 |

(Continued)

*Primary Examiner* — Ramesh B Patel
(74) *Attorney, Agent, or Firm* — Sughrue Mion, PLLC

(57) ABSTRACT

A monitoring control system includes: a safety control device that includes a state monitoring unit that monitors a state of a plant after emergency shut-down of the plant, and a work progress monitoring unit that monitors a work progress after the emergency shut-down of the plant; and a display device that displays, in a case where the emergency shut-down of the plant is performed by the safety control device, an emergency shut-down screen including a monitoring result of the state monitoring unit and a monitoring result of the work progress monitoring unit.

20 Claims, 10 Drawing Sheets

(56) References Cited

U.S. PATENT DOCUMENTS

| | | | | |
|---|---|---|---|---|
| 5,462,114 A * | 10/1995 | Catanese, Jr. | ............ | E21B 34/06 166/53 |
| 5,586,050 A * | 12/1996 | Makel | ...................... | B67D 7/08 340/5.92 |
| 5,608,657 A * | 3/1997 | Conway | ............. | G05B 23/0205 700/79 |
| 7,561,937 B2 * | 7/2009 | Reed | .................. | C23C 14/3414 700/109 |
| 9,811,081 B2 * | 11/2017 | Junk | .................. | G05B 23/0256 |
| 2004/0193290 A1 * | 9/2004 | Ott | ........................... | G05B 9/02 700/18 |
| 2008/0082184 A1 * | 4/2008 | Murakami | ......... | G05B 19/0425 700/79 |
| 2008/0221721 A1 * | 9/2008 | Reed | .................. | C23C 14/3414 700/109 |
| 2011/0054828 A1 * | 3/2011 | Junk | .................. | G05B 23/0256 702/125 |
| 2011/0061861 A1 * | 3/2011 | Flanders | ............... | E21B 43/128 166/250.01 |
| 2012/0042721 A1 * | 2/2012 | Al-Buaijan | ........... | F15B 19/005 73/168 |

FOREIGN PATENT DOCUMENTS

| | | |
|---|---|---|
| JP | 2002-215228 A | 7/2002 |
| JP | 2007-115178 A | 5/2007 |
| JP | 4671131 B2 | 4/2011 |
| JP | 2012-3601 A | 1/2012 |

* cited by examiner

MONITORING CONTROL SYSTEM AND WORK SUPPORT METHOD

BACKGROUND OF THE INVENTION

Field of the Invention

The present invention relates to a monitoring control system and a work support method.

Priority is claimed on Japanese Patent Application No. 2016-006086, filed Jan. 15, 2016, the content of which is incorporated herein by reference.

Description of Related Art

All patents, patent applications, patent publications, scientific articles, and the like, which will hereinafter be cited or identified in the present application, will hereby be incorporated by reference in their entirety in order to describe more fully the state of the art to which the present invention pertains.

In the related art, in a plant, a factory, or the like (which may be generally referred to as a "plant", hereinafter), a monitoring control system is provided, and an advanced automatic operation is realized. In order to perform an advanced control while securing safety, such a monitoring control system includes a distributed control system (DCS) which is a process control system that performs a control of an industrial process realized in the plant, and a safety system such as a safety instrumentation system (SIS).

The distributed control system is a system in which a field device (measurer or manipulator) and a controller that controls the field device are connected to each other through communication means and the controller collects measurement data obtained by the field device and manipulates (controls) the field device according to the collected measurement data to control various state amounts in an industrial process. The safety instrumentation system is a system that causes a plant to reliably stop in a safe state in an emergency in order to prevent an explosion accident, an injury accident, or environmental contamination before it occurs, to thereby protect an expensive facility.

During operation of a plant, in a case where an abnormality that may cause an accident occurs (for example, device failure, response abnormalities, explosive gas limit being exceeded, or the like), emergency shut-down (ESD) of the plant is performed by the safety instrumentation system as a primary action for securing safety. For example, in a chemical plant, an action of stopping supply of raw materials to a reactor to stop chemical reaction in the reactor is performed. By performing such an action, it is possible to prevent the occurrence of accidents, to thereby secure safety of the plant.

Japanese Patent Publication No. 4671131 discloses a safety instrumentation system that can manipulate a device which is provided in the safety instrumentation system through a distributed control system while reducing a workload of engineering. Specifically, in the safety instrumentation system, a manipulation according to an instruction with respect to the safety instrumentation system is executed, and an instruction with respect to the distributed control system is converted into an instruction with a format suitable for the safety instrumentation system for execution. Further, in a case where the respective instructions conflict with each other, the instruction with respect to the safety instrumentation system is preferentially executed.

However, in a case where the above-described ESD of the plant is performed, it is necessary to determine a situation of the plant, to perform a suitable action (secondary action) according to the determined situation, and then, to restart the plant. However, in the monitoring control system in the related art, the ESD of the plant which is the primary action is considered, but an action after the ESD of the plant is performed (an action before the plant is restarted) is not considered, and is left for determination of an operator of the plant. Thus, in the related art, a workload of the operator becomes large after the ESD of the plant is performed, and there may be a long period of time until the restart. Specifically, for example, the following problems are caused.

(1) Time Necessary for Determining Situation of Entire Plant

Most of a plant operation screen displays a part of a plant (a part of devices, apparatuses, and facilities installed in the plant), whereas important portions (for example, an important sensor or an emergency shut-down valve) to be checked by an operator of the plant after emergency shut-off of the plant is performed are scattered over the entire plant. Thus, in order to determine situations of the entire plant, the operator of the plant needs to collect information while changing the plant operation screen, and thus, time is necessary for determining the situations of the entire plant.

Further, while the emergency shut-down of the plant is being performed, in a case where an abnormality occurs in a device installed in the plant, it is necessary to specify the device where the abnormality occurs, but in an information collecting method in the related art for collecting information while changing the plant operation screen, time is necessary for the specification. In this way, in the information collecting method in the related art, since the operator needs to perform complicated manipulations in order to collect necessary information, this may lead to wrong recognition and an erroneous operation.

(2) Difficulties in Recognition of Work Progress and Plant State Transition after Emergency Shut-Down As described above, in the monitoring control system in the related art, an action after emergency shut-down of a plant is performed is not considered. Thus, in the related art, the operator of the plant needs to collectively consider information displayed on a plant operation screen to determine work progress, and thus, it is difficult to determine the work progress. Further, since the determination of the work progress and determination of the plant state transition greatly depend on the performance or experience of an operator of the plant, there is a concern that variations in operation quality, and reduction in overall work safety and efficiency may occur.

(3) Time Taken for Specification of Cause of Emergency Shut-Down

There are rare cases where the number of causes of emergency shut-down of a plant is only one, and instead, there are many cases where the number of causes of emergency shut-down is plural. In particular, in a large-scale plant, the number of causes of emergency shut-down of the plant is plural, in most cases. In the related art, causes of emergency shut-down have been determined by analyzing time series information such as an alarm summary or an event log, but in a case where there are plural causes of emergency shut-down of the plant, time is taken for analysis.

(4) High Degree of Freedom of Manipulation

As described above, since an action after emergency shut-down of a plant is performed is left for determination of an operator of the plant, in a monitoring control system in the related art, the degree of freedom of a manipulation is set to be high to some extent. For example, it is possible to avoid (bypass or reset) interlock (for example, emergency shut-off valve, or the like) by a manipulation of the operator, regardless of states (during emergency shut-down, during shut-down, and during operation) of the plant. If such a manipulation is performed under calm determination of a skilled operator, it does not cause problems. However, if such a manipulation is performed by wrong determination in an emergency when emergency shut-down of a plant is performed, it may cause problems. Thus, in an emergency when emergency shut-down of the plant is performed, for example, if a manipulation for avoiding interlock is limited until appropriate conditions (for example, conditions that the plant can be restarted) are satisfied, it can be considered that it is possible to reduce a workload of an operator and to enhance safety.

SUMMARY OF THE INVENTION

The invention provides a monitoring control system and a work support method capable of reducing a workload of an operator after emergency shut-down of a plant is performed to reduce wrong recognition and an erroneous operation, and reducing a period of time taken for restarting the plant.

According to an aspect of the invention, there is provided a monitoring control system which includes a safety control device (20) that includes a state monitoring unit (24a) that monitors a state of a plant (100) after emergency shut-down of the plant, and a work progress monitoring unit (24b) that monitors a work progress after the emergency shut-down of the plant; and a display device (30) that displays, in a case where the emergency shut-down of the plant is performed by the safety control device, an emergency shut-down screen (G) including a monitoring result of the state monitoring unit and a monitoring result of the work progress monitoring unit.

In the monitoring control system according to this aspect of the invention, the state monitoring unit may determine a cause of the emergency shut-down of the plant, and the display device may display the cause determined by the state monitoring unit on the emergency shut-down screen.

The safety control device may collect process information from devices provided in the plant, determine whether or not an abnormality occurs in the plant based on the collected information, and perform emergency shut-down of the plant by outputting a trigger signal for the emergency shut-down of the plant when determining that an abnormality occurs in the plant. The state monitoring unit may start its operation when receiving the trigger signal from the safety control station, and monitor a state of the plant after the emergency shut-down of the plant using information collected in the safety control device.

The state monitoring unit may monitor a preset important monitoring device to determine whether the device is normal or abnormal, and notify a place where the abnormality occurs to the display device when determining that the device is abnormal. The display device may change a display of at least one of the monitoring result of the state monitoring unit and the monitoring result of the work progress monitoring unit in the emergency shut-down screen when an abnormality occurrence place is notified to the display device from the state monitoring unit.

The state monitoring unit may detect an initially obtained cause among plural causes which are considered as causes of the emergency shut-down of the plant as a main cause of the emergency shut-down of the plant, and notifies the main cause to the display device. The display device may display the main cause determined by the state monitoring unit on the emergency shut-down screen.

In the monitoring control system according to this aspect of the invention, the display device may display a process flow diagram in which devices, apparatuses or facilities necessary for performing work after the emergency shut-down of the plant are collectively shown, among devices, apparatuses or facilities provided in the plant, on the emergency shut-down screen.

In the monitoring control system according to this aspect of the invention, the display device may display time series information obtained from devices, apparatuses or facilities for which monitoring is necessary after the emergency shut-down of the plant on the emergency shut-down screen.

In the monitoring control system according to this aspect of the invention, the display device may display time series information obtained from devices, apparatuses or facilities included in the process flow diagram, among devices, apparatuses or facilities for which monitoring is necessary after the emergency shut-down of the plant in an overlapping manner on the process flow diagram.

In the monitoring control system according to this aspect of the invention, in a case where the work progress monitoring unit determines that work is completed, the display device may display a release button (B2) for releasing the emergency shut-down of the plant on the emergency shut-down screen.

In the monitoring control system according to this aspect of the invention, the state monitoring unit may notify, in a case where an abnormality of a device, an apparatus or a facility provided in the plant occurs after the emergency shut-down of the plant, the display device of a place where the abnormality occurs, and the display device may change the display of at least one of the monitoring result of the state monitoring unit and the monitoring result of the work progress monitoring unit on the emergency shut-down screen according to notification details from the state monitoring unit.

In the monitoring control system according to this aspect of the invention, the display device may display a link button (B1) to the emergency shut-down screen on a plant operation screen in a case where the emergency shut-down of the plant is performed by the safety control device, and may display the emergency shut-down screen when a manipulation with respect to the link button is performed.

The monitoring control system according to this aspect of the invention may further include: a control device (10) that includes an action execution unit (14) that executes an action with respect to the plant after the emergency shut-down of the plant, and controls devices, apparatuses or facilities provided in the plant based on process information obtained from the devices, apparatuses or facilities provided in the plant, and the work progress monitoring unit may monitor the work progress after the emergency shut-down of the plant according to an execution situation of the action execution unit of the control device.

The control device may start its operation when receiving the trigger signal from the safety control station, perform an operation of controlling the device provided in the plant to enter a stable state that is predetermined by changing operating conditions of the device, and output information regarding the operation to the work progress monitoring unit.

The work progress monitoring unit may start its operation when receiving the trigger signal from the safety control station, determine whether or not the device is being in the stable state for a predetermined time based on the information regarding the operation from the control device, and output an allowance signal indicating allowance of interlock resetting of the plant to the display device when determining that the device is being in the stable state for the predetermined time. The display device may display a release button for releasing the emergency shut-down of the plant on the emergency shut-down screen when receiving the allowance signal.

According to another aspect of the invention, there is provided a work support method for supporting work performed after emergency shut-down of a plant (100), including: a first step (S11) of monitoring a state of the plant after the emergency shut-down of the plant; a second step (S12) of monitoring a work progress after the emergency shut-down of the plant; and a third step (S16) of displaying an emergency shut-down screen (G) including a monitoring result obtained in the first step and a monitoring result obtained in the second step.

The work support method may further include: in the first step, determining a cause of the emergency shut-down of the plant; and in the third step, displaying the cause determined by the state monitoring unit on the emergency shut-down screen.

The work support method may further include: in the third step, displaying a process flow diagram in which devices, apparatuses or facilities necessary for performing work after the emergency shut-down of the plant are collectively shown, among devices, apparatuses or facilities provided in the plant, on the emergency shut-down screen.

The work support method may further include: in the third step, displaying time series information obtained from devices, apparatuses or facilities for which monitoring is necessary after the emergency shut-down of the plant on the emergency shut-down screen.

The work support method may further include: in the third step, displaying time series information obtained from devices, apparatuses or facilities included in the process flow diagram, among devices, apparatuses or facilities for which monitoring is necessary after the emergency shut-down of the plant in an overlapping manner on the process flow diagram.

The work support method may further include: in a case where it is determined that work is completed in the second step, in the third step, displaying a release button that releases the emergency shut-down of the plant on the emergency shut-down screen.

The work support method may further include: in the first step, in a case where an abnormality of a device, an apparatus or a facility provided in the plant occurs after the emergency shut-down of the plant, outputting a notification of a place where the abnormality occurs; and in the third step, changing the display of at least one of the monitoring result obtained in the first step and the monitoring result obtained in the second step on the emergency shut-down screen according to the notification from the first step.

The work support method may further include: in the third step, displaying a link button to the emergency shut-down screen on a plant operation screen in a case where the emergency shut-down of the plant is performed, and displaying the emergency shut-down screen when a manipulation with respect to the link button is performed.

The work support method may further include: an executing step of executing an action with respect to the plant after the emergency shut-down of the plant, and controlling devices, apparatuses or facilities provided in the plant based on process information obtained from the devices, apparatuses or facilities provided in the plant; and in the second step, monitoring the work progress after the emergency shut-down of the plant according to an execution situation of the executing step.

According to the invention, a state monitoring unit that monitors a state of a plant after emergency shut-down of the plant and a work progress monitoring unit that monitors a work progress after the emergency shut-down of the plant are provided in a safety control device, and in a case where the emergency shut-down of the plant is performed by the safety control device, an emergency shut-down screen including a monitoring result of the state monitoring unit and a monitoring result of the work progress monitoring unit is displayed on a display device. Thus, it is possible to reduce a workload of an operator after the emergency shut-down of the plant is performed to reduce wrong recognition or an erroneous operation, and to reduce a period of time taken for restarting the plant.

BRIEF DESCRIPTION OF THE DRAWINGS

The above features and advantages of the present invention will be more apparent from the following description of certain preferred embodiments taken in conjunction with the accompanying drawings.

DETAILED DESCRIPTION OF THE INVENTION

Hereinafter, a monitoring control system and a work support method according to an embodiment of the invention will be described in detail with reference to the accompanying drawings.

(Monitoring Control System)

Figure 1:
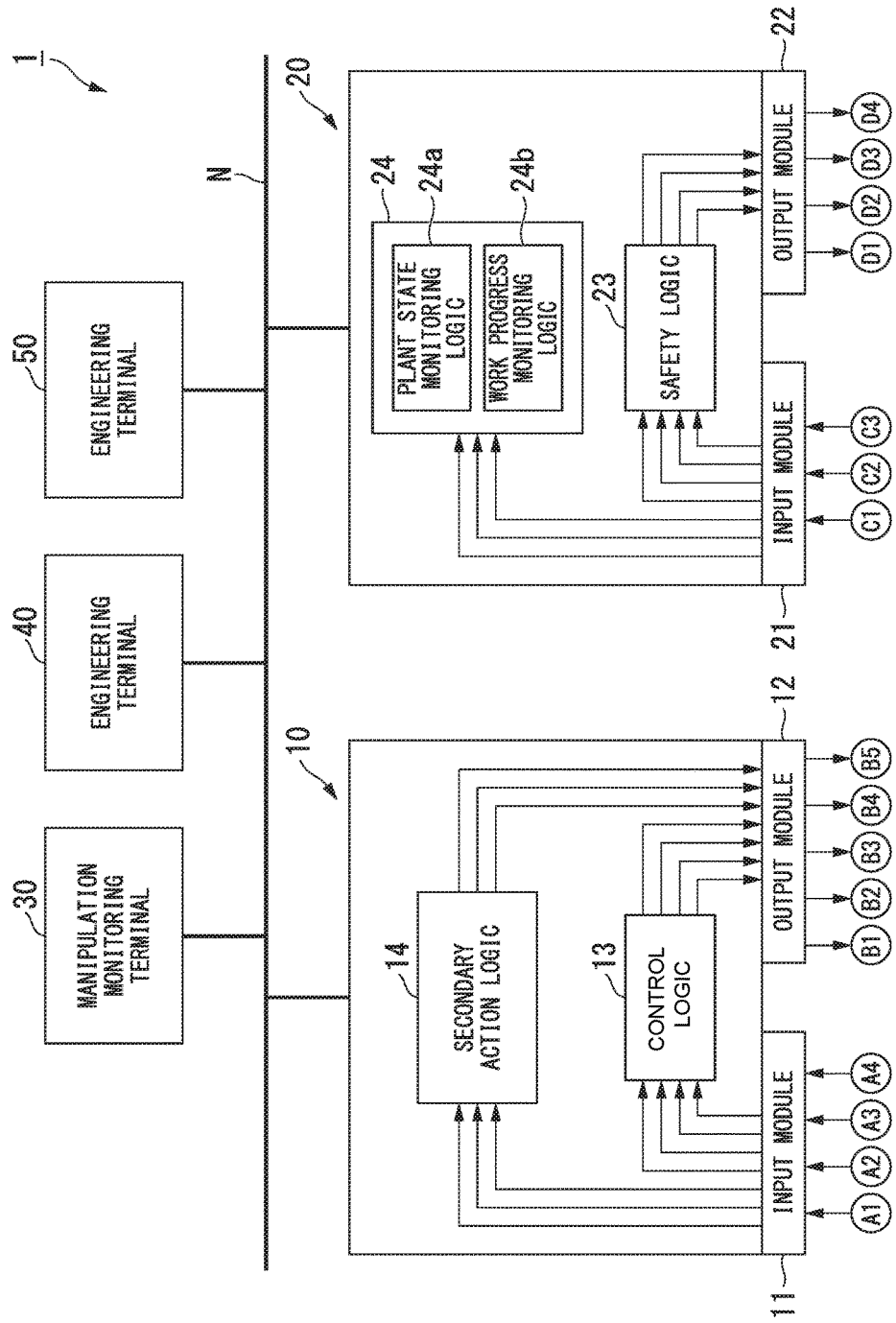
FIG. 1 is a block diagram showing an entire configuration of a monitoring control system according to an embodiment of the invention.

FIG. 1 is a block diagram showing an entire configuration of a monitoring control system according to an embodiment of the invention. As shown in FIG. 1, a monitoring control system 1 of this embodiment includes a control station 10 (control device), a safety control station 20 (safety control device), a manipulation monitoring terminal 30 (display device), and engineering terminals 40 and 50. The monitoring control system 1 performs an automatic operation of a plant, and performs maintenance of the plant, for example.

The control station 10, the safety control station 20, the manipulation monitoring terminal 30, and the engineering terminals 40 and 50 that form the monitoring control system 1 are connected to each other through a network N, and may perform exchange of information therebetween. The network N is a wired or wireless network provided in a plant 100. As the network N, for example, a Vnet/IP (registered trademark) may be used.

Here, as the plant, there is an industrial plant such as a chemical plant, a plant that manages and controls a well site such as a gas field or an oil field, or the peripheral thereof, a plant that manages and controls power generation of hydraulic power, thermal power, atomic power or the like, a plant that manages and controls environmental power generation such as sunlight or wind power, a plant that manages and controls water supply and sewerage, a dam or the like, for example. In this embodiment, for ease of understanding, it is assumed that a plant which is automatically operated by the monitoring control system 1 is a chemical plant.

Figure 2:
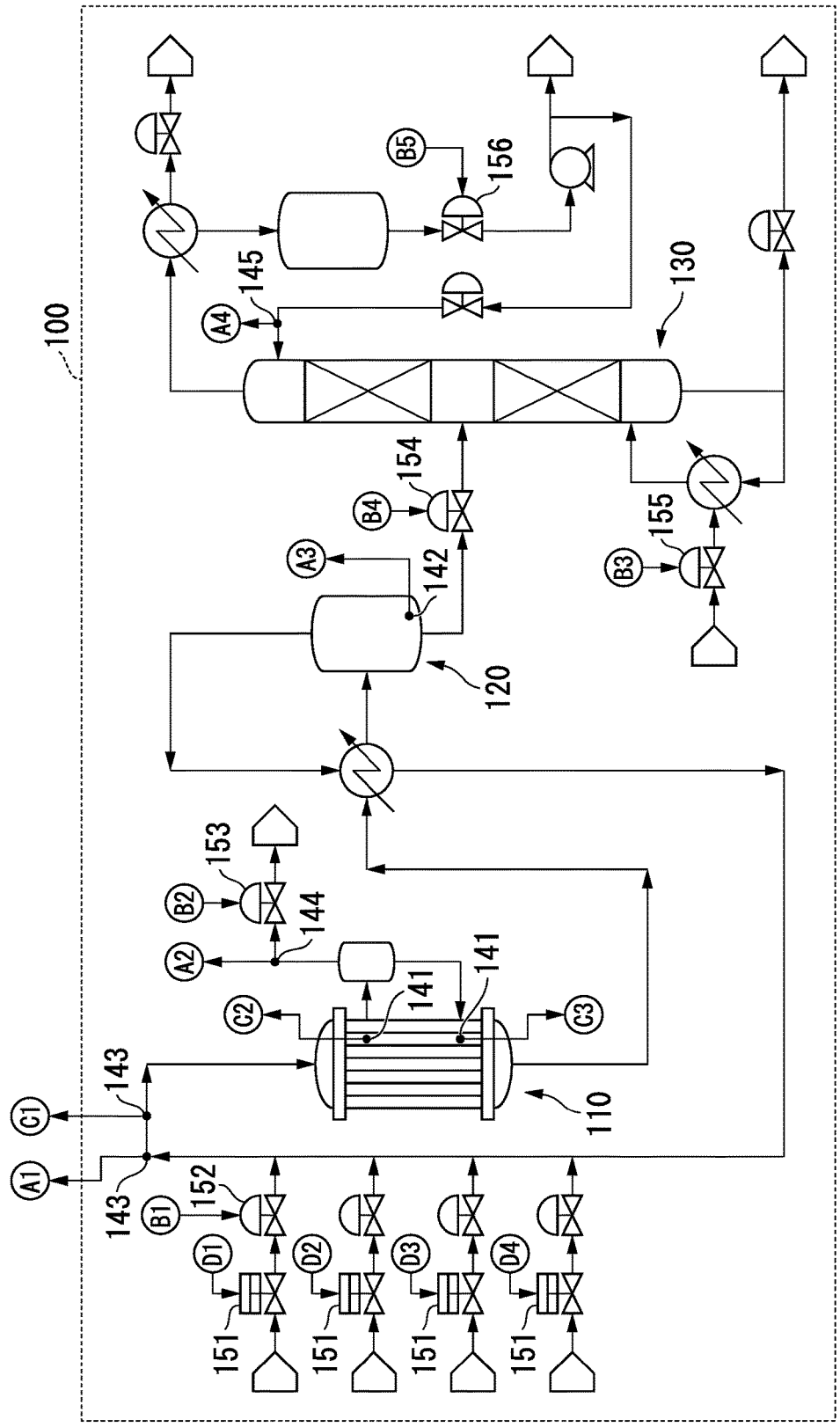
FIG. 2 is a diagram showing an example of a plant which is automatically operated by a monitoring control system according to an embodiment of the invention.

FIG. 2 is a diagram showing an example of a plant which is automatically operated by a monitoring control system according to an embodiment of the invention. The plant 100 shown in FIG. 2 is a chemical plant that includes a reactor 110, a vapor-liquid separator 120, and a distillation tower 130. The reactor 110 is an apparatus that is supplied with a raw material of a product and performs a chemical reaction necessary for manufacturing the product with respect to the supplied material.

The vapor-liquid separator 120 is an apparatus that is provided on a downstream side of the reactor 110 and separates a gas component and a liquid component included in a product material obtained by a chemical reaction in the reactor 110. The distillation tower 130 is an apparatus that is provided on a downstream side of the vapor-liquid separator 120 and separates and condenses components having different boiling points included in the vapor-liquid component by evaporating the liquid component separated by the vapor-liquid separator 120 and then condensing its resultant.

Various sensors and various valves are provided in the plant 100 shown in FIG. 2, in addition to the reactor 110, the vapor-liquid separator 120, and the distillation tower 130. As the various sensors, for example, sensors 141 and 142 that respectively measures states (temperatures, pressures, of liquid surface positions, or the like) of the reactor 110 and the vapor-liquid separator 120 are provided, for example. Further, a sensor 143 that measures the amount of a raw material supplied to the reactor 110 or the amount of a product material recovered by the reactor 110, a sensor 144 that measures the volume of gas generated by the reactor 110, and a sensor 145 that measures the reflux volume of a distillate returned to an overhead of the distillation tower 130 are also provided.

Further, as the various valves, for example, an emergency shut-off valve 151 that stops the supply of a raw material to the reactor 110 when an abnormality occurs in the plant 100, and a valve 152 that adjusts the amount of the raw material supplied to the reactor 110. Further, a valve 153 that adjusts the flow rate of gas generated in the reactor 110, a valve 154 that adjusts the amount of supply (feed flow rate) of a liquid component to the distillation tower 130 from the vapor-liquid separator 120, and valves 155 and 156 that respectively adjust a bottom steam boiling volume and an overhead reflux volume in the distillation tower 130 are also provided.

The control station 10 is an apparatus that forms the core of a distributed control system, and controls, based on process information (information indicating the temperature, the pressure, the flow rate, or the like) obtained from a device, an apparatus, or a facility (which may be collectively and simply referred to as a "device", hereinafter) provided in the plant 100, the device provided in the plant 100. The control station 10 includes an input module 11, an output module 12, a control logic 13, and a secondary action logic 14 (action execution unit).

The input module 11 is a module that collects a variety of process information from the device provided in the plant 100. For example, the input module 11 collects process information indicating a state (a temperature, a pressure, a liquid surface position, or the like) of the vapor-liquid separator 120 from the sensor 142 shown in FIG. 2, and collects process information indicating the amount of a raw material supplied to the reactor 110 or the amount of a product material recovered by the reactor 110 from the sensor 143 shown in FIG. 2. Further, the input module 11 collects process information relating to gas generated in the reactor 110 and process information indicating the amount of a distillate returned to the overhead of the distillation tower 130 from the sensors 144 and 145 shown in FIG. 2. The type and amount of the process information collected by the input module 11 are arbitrary.

The output module 12 is a module that outputs control signals (control signals for manipulating (controlling) a device provided in the plant 100)) generated in the control logic 13 and the secondary action logic 14 to the outside thereof. For example, the output module 12 outputs control signals for controlling the valves 152 to 156 shown in FIG. 2. The type and amount of control information output from the output module 12 are arbitrary.

The control logic 13 calculates a manipulation variable for controlling the device provided in the plant 100 using the process information collected in the input module 11, and outputs a control signal indicating the calculated manipulation variable to the output module 12. When the device (for example, a valve) provided in the plant 100 is properly controlled by the control logic 13, an automatic work of the plant 100 is realized.

The secondary action logic 14 executes an action with respect to the plant 100 after emergency shut-down (secondary action). The secondary action logic 14 starts its operation in a case where a trigger signal (trigger signal for emergency shut-down of the plant 100) transmitted from the safety control station 20 is received, and performs a secondary action necessary for restarting the plant 100 after the emergency shut-down of the plant 100 is performed.

Specifically, the secondary action logic 14 performs a secondary action for changing operating conditions of an apparatus (for example, the distillation tower 130 positioned on the downstream side of the reactor 110) which is a secondary action target after the emergency shut-down of the plant 100 for stabilization. For example, the secondary action logic 14 performs a secondary action for controlling the valve 154 shown in FIG. 2 to reduce a feed flow rate with respect to the distillation tower 130, and controlling the valves 155 and 156 to adjust a bottom steam boiling volume and an overhead reflux volume of the distillation tower 130, and performing shift to an entire reflux operation to stabilize the distillation tower 130.

Further, the secondary action logic 14 also performs mode switching of a control system (a PID controller, an indicating instrument, a sequence logic, or the like which is not shown) which is not connected to the safety control station 20, a fall-back process, or the like, as the secondary action. Information indicating the secondary action performed in the secondary action logic 14 is transmitted to the safety control station 20 from the control station 10 through the network N.

The safety control station 20 is an apparatus that forms the core of the safety instrumentation system, which obtains necessary information (including process information) from a device provided in the plant 100 and performs emergency shut-down (primary action for securing safety) of the plant 100 in a case where it is determined that an abnormality occurs in the plant 100. The safety control station 20 includes an input module 21, an output module 22, a safety logic 23, and a monitoring logic 24. The safety logic 23 and the monitoring logic 24 mounted in the safety control station 20 may be mounted in the control station 10 according to a configuration of the monitoring control system 1 of the plant.

The input module 21 is a module that collects a variety of information from a device provided in the plant 100. For example, the input module 21 collects process information indicating a state (a temperature, a pressure, a liquid surface position, or the like) of the reactor 110 from the sensor 141 shown in FIG. 2, and collects process information indicating the amount of a raw material supplied to the reactor 110 or the amount a product material recovered by the reactor 110 from the sensor 143 shown in FIG. 2. Here, the type and number of process information collected by the input module 21 are arbitrary.

The output module 22 is a module that outputs a control signal (control signal for emergency shut-down of the plant 100) output from the safety logic 23 to the outside thereof. For example, the output module 22 outputs a control signal for controlling the emergency shut-off valve 151 shown in FIG. 2. Here, the type and number of control information output from the output module 22 are arbitrary.

The safety logic 23 determines whether it is necessary to perform emergency shut-down of the plant 100 using the information collected in the input module 21. In a case where it is determined that it is necessary to perform the emergency shut-down of the plant 100, the safety logic 23 outputs a control signal for performing emergency shut-down of the plant 100 to the output module 22. In a case where an abnormality occurs in the plant 100, by controlling the emergency shut-off valve 151 or the like using the safety logic 23, it is possible to perform the emergency shut-down of the plant 100 which is a primary action for securing safety. In a case where it is determined that it is necessary to perform the emergency shut-down of the plant 100, the safety logic 23 outputs the above-mentioned trigger signal (trigger signal for emergency shut-down of the plant 100).

The monitoring logic 24 includes a plant state monitoring logic 24a (state monitoring unit) and a work progress monitoring logic 24b (work progress monitoring unit), and performs monitoring after emergency shut-down of the plant 100. The monitoring logic 24 transmits monitoring results (a monitoring result of the plant state monitoring logic 24a and a monitoring result of the work progress monitoring logic 24b) to the manipulation monitoring terminal 30 through the network N.

The plant state monitoring logic 24a monitors the state of the plant 100 after emergency shut-down of the plant 100 using information collected in the input module 21. The plant state monitoring logic 24a starts its operation in a case where a trigger signal output from the safety logic 23 is input, monitors a preset important monitoring point (for example, the reactor 110 or the distillation tower 130 shown in FIG. 2) of the plant 100, and determines whether the monitoring point is normal or abnormal. In a case where the plant state monitoring logic 24a determines that a device provided in the plant 100 is abnormal, the plant state monitoring logic 24a notifies the manipulation monitoring terminal 30 of a place where the abnormality occurs.

For example, the plant state monitoring logic 24a monitors a supply state of a raw material to the reactor 110. In a case where the amount of the raw material supplied to the reactor 110 is 0, the plant state monitoring logic 24a determines that the device is normal, and in a case where the amount of the raw material supplied to the reactor 110 is not 0, the plant state monitoring logic 24a determines that the device is abnormal. Further, the plant state monitoring logic 24a monitors the temperature of the reactor 110. If a temperature decrease of the entire reactor 110 occurs due to stop of the supply of the raw material, the plant state monitoring logic 24a determines that the device is normal, and if a temperature increase occurs, the plant state monitoring logic 24a determines that the device is abnormal. Further, the plant state monitoring logic 24a monitors an operating state of the distillation tower 130. If minimum bottom steam boiling and overhead reflux are performed, and thus, qualities of products at the bottom and overhead are within a predetermined range, the plant state monitoring logic 24a determines that the device is normal, and if at least one of the qualities of the products at the bottom and overhead is out of the predetermined range, the plant state monitoring logic 24a determines that the device is abnormal.

Further, the plant state monitoring logic 24a determines causes of emergency shut-down of the plant 100. Specifically, the plant state monitoring logic 24a determines an initially obtained cause among plural causes which are considered as the causes of the emergency shut-down of the plant 100 as a main cause of the emergency shut-down of the plant 100. For example, in a case where the temperature of the reactor 110 first abnormally increases, and then, an oxygen concentration in the reactor 110 abnormally increases, and thus, emergency shut-down of the plant 100 is performed due to the abnormalities, the plant state monitoring logic 24a determines a temperature abnormality of the reactor 110 which is initially obtained as a cause (main cause) of the emergency shut-down of the plant 100.

The work progress monitoring logic 24b monitors a work progress after emergency shut-down of the plant 100 using information collected in the input module 21 and information (information indicating a secondary action performed in the secondary action logic 14) obtained through the network N. The work progress monitoring logic 24b starts its operation in a case where a trigger signal is input from the safety logic 23 is input, similar to the plant state monitoring logic 24a.

For example, the work progress monitoring logic 24b performs the following monitoring.

(a) Primary Action Completion Monitoring

This monitoring refers to monitoring whether a device (for example, the reactor 110) which is a primary action target after emergency shut-down shifts to a predetermined safety state (for example, a state where complete stop of the supply of a raw material is performed and its temperature is within a safety range).

(b) Secondary Action Completion Monitoring

This monitoring refers to monitoring whether a device (for example, the distillation tower 130) which is a secondary action target after emergency shut-down transitions to a predetermined operation state or enters a stable state under the control of the secondary action logic 14 of the control station 10.

(c) Safety State Monitoring

This monitoring refers to monitoring that a primary action and a secondary action are all completed and an entire state of the plant 100 is stabilized (a state where device abnormality or other disturbances are not generated and an instable behavior is not shown).

Further, as a result of the monitoring, in a case where it is determined that all the actions are completed, the work progress monitoring logic 24b allows interlock reset (for example, release of shut-off by means of the emergency shut-off valve 151 shown in FIG. 2). If an interlock reset instruction is performed by an operator, the plant 100 is released from emergency shut-down and enters a restartable state. In this way, if the interlock reset is allowed in a case where all the actions are completed after emergency shut-down of the plant 100, it is possible to reduce a workload of an operator to prevent an erroneous operation, thereby enhancing safety.

The manipulation monitoring terminal 30 is a device that is manipulated by an operator of the plant 100 and is used for entire manipulation monitoring of the plant 100. A plant operation screen for manipulating and monitoring the plant 100 is displayed on the manipulation monitoring terminal 30. The operator of the plant 100 develops the plant operation screen displayed on the manipulation monitoring terminal 30 to determine an entire state of the plant 100, and performs manipulation input as necessary. Thus, it is possible to monitor all kinds of information input and output in the control station 10 and the safety control station 20 and states of various logics provided in the control station 10 and the safety control station 20, from the manipulation monitoring terminal 30.

Further, an emergency shut-down screen G (see FIG. 3) which is a dedicated operation screen in a case where emergency shut-down of the plant 100 is performed by the safety control station 20 is displayed on the manipulation monitoring terminal 30. The emergency shut-down screen G is a screen that is provided to reduce a workload of an operator after emergency shut-down of the plant 100 is performed to reduce wrong recognition or an erroneous operation and to efficiently execute a secondary action after emergency shut-down of the plant 100. Although details will be described later, when a display instruction is given from the operator after emergency shut-down of the plant 100, the emergency shut-down screen G is displayed on the manipulation monitoring terminal 30.

Figure 3:
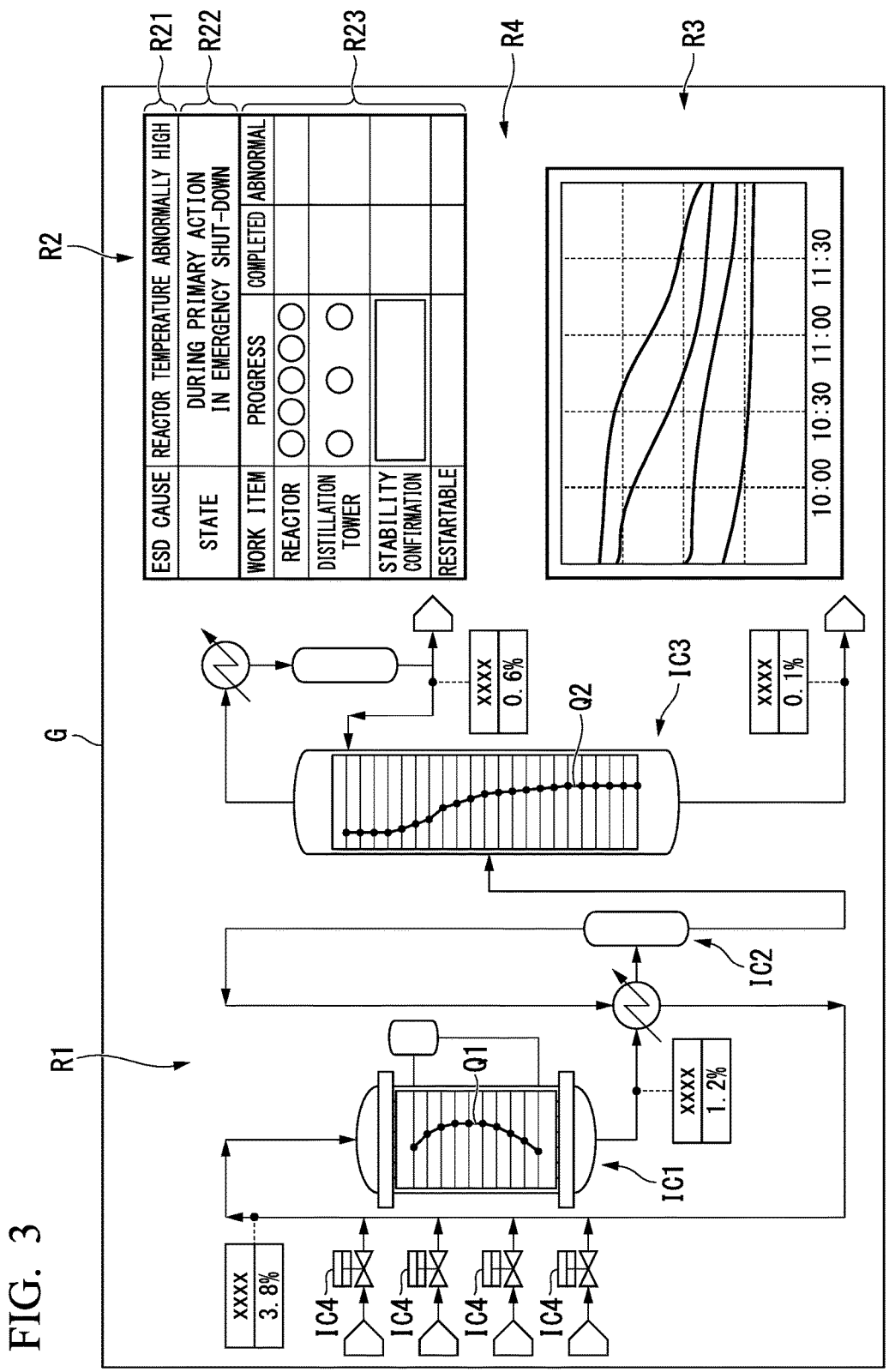
FIG. 3 is a diagram showing an example of an emergency shut-down screen according to an embodiment of the invention.

FIG. 3 is a diagram showing an example of an emergency shut-down screen according to an embodiment of the invention. As shown in FIG. 3, a process flow diagram display region R1, a monitoring result display region R2, a trend display region R3, and an interlock reset button display region R4 are provided in the emergency shut-down screen G. The process flow diagram display region R1 is a region where a process flow diagram in which devices necessary for performing work after emergency shut-down of the plant 100 are collectively shown, among devices provided in the plant 100, is displayed. The process flow diagram display region R1 is provided so that the operator can easily and rapidly determine the entire situation of the plant 100 after emergency shut-down of the plant 100.

In the example shown in FIG. 3, a process flow diagram in which the reactor 110, the vapor-liquid separator 120, the distillation tower 130, and the emergency shut-off valve 151, and the like provided in the plant 100 shown in FIG. 2 are collectively shown is displayed in the process flow diagram display region R1. As shown in FIG. 3, in the process flow diagram, the collected devices are displayed as stylized icons. For example, the reactor 110, the vapor-liquid separator 120, the distillation tower 130, and the emergency shut-off valve 151 shown in FIG. 2 are displayed as icons IC1 to IC4, respectively. In order to more specifically monitor the devices without leakage, the reactor 110, the vapor-liquid separator 120, and the distillation tower 130 are displayed on separate plant operation screens.

The monitoring result display region R2 is a region where monitoring results of the monitoring logic 24 (the plant state monitoring logic 24a and the work progress monitoring logic 24b) provided in the safety control station 20, or the like is displayed. The monitoring result display region R2 is provided so that the operator can easily and accurately determine the state of the plant 100 and the work progress of the secondary action after emergency shut-down of the plant 100 is performed.

As shown in FIG. 3, a cause display region R21, a state display region R22, and a work progress display region R23 are provided in the monitoring result display region R2. The cause display region R21 is a region where a cause of emergency shut-down (ESD cause) of the plant 100 determined by the plant state monitoring logic 24a of the safety control station 20. In the example shown in FIG. 3, "temperature of reactor is abnormally high" is displayed as the ESD cause. The state display region R22 is a region where a monitoring result (a state of the plant 100) of the plant state monitoring logic 24a provided in the safety control station 20 is displayed. In the example shown in FIG. 3, "during emergency shut-down as primary action" is displayed as the state of the plant 100.

The work progress display region R23 is a region where a monitoring result (work progress) of the work progress monitoring logic 24b provided in the safety control station 20. As shown in FIG. 3, "work item", "progress", "completed", and "abnormal" are displayed in the work progress display region R23, for example. The "work item" represents work to be performed after emergency shut-down of the plant 100. In the example shown in FIG. 3, as the "work item", "reactor" which is work relating to the reactor 110, "distillation tower" which is work relating to the distillation tower 130, "stability checked", and "restartable" are displayed.

The "progress" represents a work progress situation. In the example shown in FIG. 3, the work progress situation is displayed in a form (for example, progress bars) that can be visually and intuitively understood. The "completed" confirmatively represents that work is completed. The example shown in FIG. 3 shows that work is completed in a form (for example, check marks) that can be visually and intuitively understood. The "abnormal" represents that an abnormality occurs in the plant 100.

In the example shown in FIG. 3, five work progresses indicated by circles are prepared with respect to the "reactor" displayed as the "work item". The five work progresses correspond to completion of state confirmation of the emergency shut-off valve 151, completion of temperature decrease confirmation of the reactor 110, completion of oxygen concentration decrease confirmation of the reactor 110, completion of flow rate measurement of nitrogen gas (purge gas supplied to the reactor 110 and the vicinity thereof), and completion of operation state confirmation of a compressor (not shown) (a device that circulates gas in the reactor 110 and in the vicinity thereof), for example.

Further, three work progresses indicated by circles are prepared with respect to the "distillation tower" displayed as the "work item". The three work progresses correspond to completion of product quality confirmation in the distillation tower 130, completion of confirmation of an operation state (a state where minimum bottom steam boiling and overhead reflux are performed) of the distillation tower 130, and completion of confirmation of whether load down (decrease of feed flow rate) is performed or not, for example.

The manipulation monitoring terminal 30 changes, in a case where an abnormality occurrence place is notified to the manipulation monitoring terminal 30 from the plant state monitoring logic 24a provided in the safety control station 20, a display of at least one of display details in the state display region R22 and display details in the work progress display region R23. For example, the manipulation monitoring terminal 30 displays "abnormality occurred" which is a character string indicating that an abnormality occurs in the state display region R22, changes a color of a progress situation displayed in the work progress display region R23, and displays sign "x" in a section of "abnormal". In addition, the manipulation monitoring terminal 30 may perform a display that supplies the abnormality occurrence place in a case where the abnormality occurrence place is notified. For example, a display in which a device where the abnormality occurs is surrounded with a red frame, among devices displayed in the process flow diagram display region R1, may be used.

The trend display region R3 is a region where time series information (for example, time series information such as temperatures, pressures, or liquid surface positions: trend) obtained from a device for which monitoring is necessary after emergency shut-down of the plant 100 is displayed. As shown in FIG. 3, the trend may be displayed in an overlapping manner on the process flow diagram displayed in the process flow diagram display region R1. In the example shown in FIG. 3, a graph Q1 (trend) indicating a change-with-time of the temperature of the reactor 110 is displayed in an overlapping manner on the icon IC1 indicating the reactor 110, and a graph Q2 (trend) indicating a change-with-time of the temperature of the distillation tower 130 is displayed in an overlapping manner on the icon IC3 indicating the distillation tower 130.

The interlock reset button display region R4 is a region where an interlock reset button (release button) for executing interlock resetting is displayed. The interlock reset button is displayed in the interlock reset button display region R4 in a case where it is determined that all the actions are completed by the work progress monitoring logic 24b provided in the safety control station 20 and interlock resetting is allowed. In this way, if the display of the interlock reset button is limited, it is possible to reduce the workload of an operator and to prevent an erroneous operation, thereby enhancing safety.

The engineering terminal 40 is a terminal for constructing various logics (the control logic 13 and the secondary action logic) executed by the control station 10, and operation screens (the plant operation screen and the emergency shut-down screen G) displayed on the manipulation monitoring terminal 30. The various logics constructed in the engineering terminal 40 are downloaded to the control station 10 through the network N, and the operation screens constructed in the engineering terminal 40 are downloaded to the manipulation monitoring terminal 30 through the network N. The engineering terminal 50 is a terminal for constructing various logics (the safety logic 23 and the monitoring logic 24) executed in the safety control station 20. The various logics constructed in the engineering terminal 50 are downloaded to the safety control station 20 through the network N.

(Work Support Method)

Figure 4:
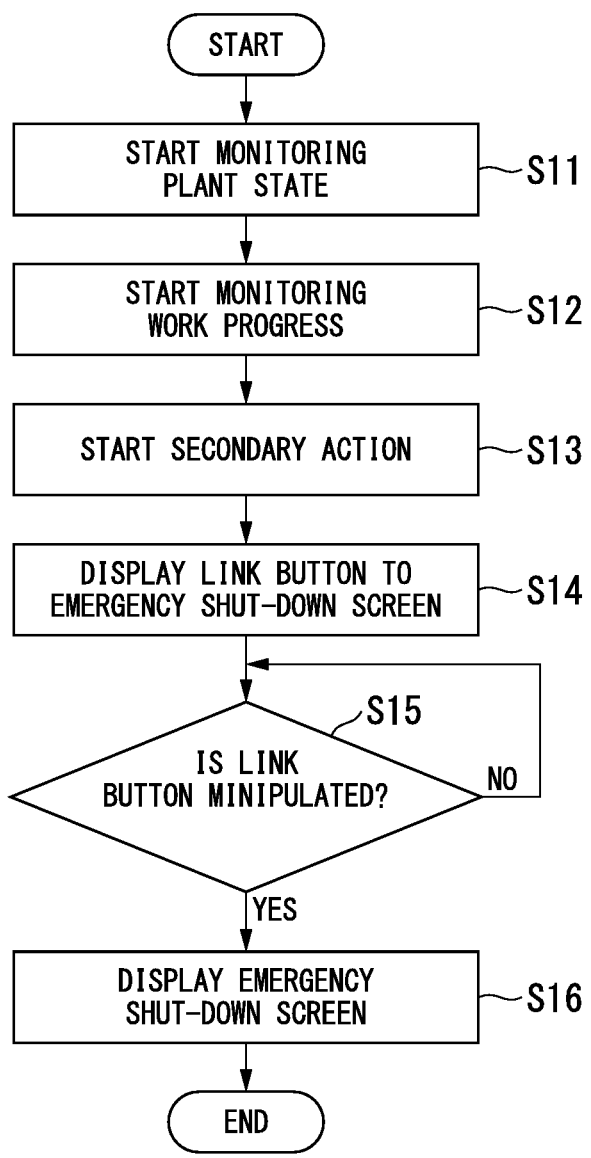
FIG. 4 is a flowchart showing an example of a work support method according to an embodiment of the invention.

Next, a work support method performed by the above-described monitoring control system 1 will be described. FIG. 4 is a flowchart showing an example of a work support method according to an embodiment of the invention. A procedure of the flowchart shown in FIG. 4 is started when the trigger signal is output from the safety logic 23 provided in the safety control station 20.

If it is determined that an abnormality occurs in the plant 100 and it is necessary to perform emergency shut-down of the plant 100 by the safety logic 23 provided in the safety control station 20, a control signal for emergency shut-down of the plant 100 is output to the output module 22 from the safety logic 23. The control signal is output to the emergency shut-off valve 151 shown in FIG. 2 through the output module 22. Thus, the emergency shut-off valve 151 enters a shut-off state, and emergency shut-down of the plant 100 which is a primary action for securing safety is performed. If the determination is made by the safety logic 23, a trigger signal is output from the safety logic 23.

If the trigger signal is input to the plant state monitoring logic 24a from the safety logic 23, an operation of the plant state monitoring logic 24a is started, and an operation of monitoring the state of the plant 100 after emergency shut-down of the plant 100 is performed using information collected by the input module 21 (step S11: first step). Specifically, a preset important monitoring point (for example, the reactor 110 or the distillation tower 130 shown in FIG. 2) of the plant 100 is monitored, and it is determined whether a device is normal or abnormal. In a case where it is determined by the plant state monitoring logic 24a that the device provided in the plant 100 is abnormal, a place where the abnormality occurs is notified to the manipulation monitoring terminal 30 from the plant state monitoring logic 24a.

Further, in the plant state monitoring logic 24a, a process of determining a cause of emergency shut-down of the plant 100 is performed, in addition to the above-described processes. For example, as an event (cause) immediately before emergency shut-down of the plant 100 is performed, in a case where a temperature abnormality of the reactor 110 is initially obtained and an oxygen concentration abnormality in the reactor 110 is then obtained, an operation of determining the initially obtained event (temperature abnormality of the reactor 110) as the cause (main cause) of emergency shut-down of the plant 100 is performed by the plant state monitoring logic 24a.

If a trigger signal is input to the work progress monitoring logic 24b from the safety logic 23, an operation of the work progress monitoring logic 24b is started, and a process of monitoring a work progress after emergency shut-down of the plant 100 is performed using information collected by the input module 21 and information obtained through the network N (information indicating a secondary action performed in the secondary action logic 14) is performed (step S12: second step).

Further, the trigger signal output from the safety logic 23 is transmitted to the control station 10 through the network N, and is transmitted to the manipulation monitoring terminal 30. If the trigger signal is received in the control station 10, an operation of the secondary action logic 14 provided in the control station 10 is started, and a secondary action necessary for restarting the plant 100, that is, an action of setting the plant 100 into a stability state is started (step S13).

Figure 5:
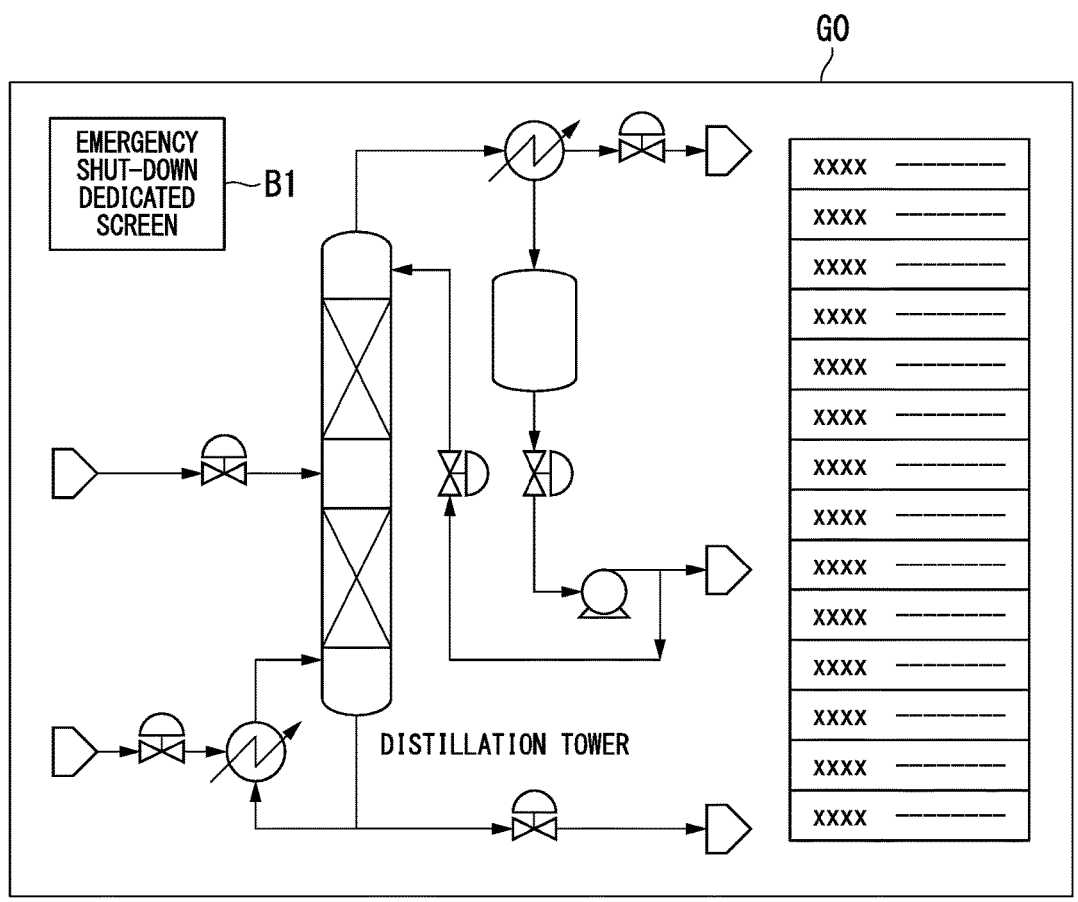
FIG. 5 is a diagram showing an example of a link button to an emergency shut-down screen in an embodiment of the invention.

Further, if the trigger signal is received in the manipulation monitoring terminal 30, as shown in FIG. 5, a process of displaying a link button B1 for displaying the emergency shut-down screen G (see FIG. 3) on a plant operation screen G0 is performed in the manipulation monitoring terminal 30 (step S14). FIG. 5 is a diagram showing an example of a link button to an emergency shut-down screen in an embodiment of the invention. The plant operation screen G0 shown in FIG. 5 is a plant operation screen displayed on the manipulation monitoring terminal 30 at a time point where emergency shut-down of the plant 100 is displayed, in which the distillation tower 130 is displayed.

In this way, if the link button B1 to the emergency shut-down screen G is displayed on the plant operation screen G0, an operator can promptly recognize that emergency shut-down of the plant 100 is performed and can display the emergency shut-down screen G to immediately start a countermeasure. The above-described processes of steps S11 to S14 may be sequentially performed as shown in FIG. 4, or may be performed in parallel.

If the link button B1 is displayed on the manipulation monitoring terminal 30 it is determined by the manipulation monitoring terminal 30 whether the displayed link button B1 is manipulated (step S15). In a case where it is determined that the link button B1 is not manipulated (in a case where the determination result is "NO"), the process of step S15 is repeatedly performed. On the other hand, if the operator performs a manipulation of pressing the link button B1, it is determined by the manipulation monitoring terminal 30 that the link button B1 is manipulated.

In a case where it is determined that the link button B1 is manipulated (in a case where the determination result is "YES"), a process of displaying the emergency shut-down screen G (see FIG. 3) is performed by the manipulation monitoring terminal 30 using monitoring results of the plant state monitoring logic 24a and the work progress monitoring logic 24b, or the like (step S16: third step). Here, the emergency shut-down screen G displayed on the manipulation monitoring terminal 30 is updated in its display details according to the state of the plant 100 and the execution situation of the secondary action. Accordingly, only by referring to the emergency shut-down screen G, it is possible for the operator to easily and rapidly determine the entire situation of the plant 100 and the work progress of the secondary action.

Figure 6:
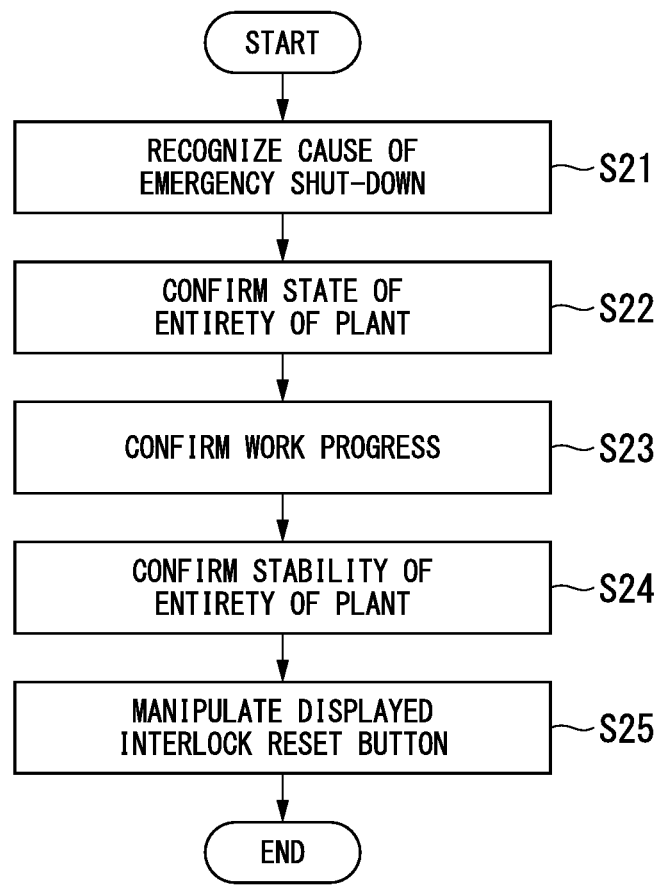
FIG. 6 is a diagram showing an example of work details of an operator performed after emergency shut-down of a plant in an embodiment of the invention.

FIG. 6 is a diagram showing an example of work details of an operator performed after emergency shut-down of a plant in an embodiment of the invention. If the emergency shut-down screen G shown in FIG. 3 is displayed on the manipulation monitoring terminal 30, first, an operator determines a cause of emergency shut-down of the plant 100 with reference to the cause display region R21 provided in the emergency shut-down screen G (step S21). For example, the operator determines that the cause of emergency shut-down of the plant 100 is "temperature of reactor is abnormally high" from the details of the cause display region R21 shown in FIG. 3. By determining the cause of emergency shut-down of the plant 100, the operator can establish a work strategy after emergency shut-down with high efficiency.

Then, the operator confirms an entire state of the plant 100 after emergency shut-down with reference to a process flow diagram displayed in the process flow diagram display region R1 provided in the emergency shut-down screen G and a trend displayed in the trend display region R3 (step S22). Here, since devices necessary for performing an operation after emergency shut-down of the plant 100 are collectively shown in the process flow diagram, it is not necessary to collect information while changing a plant operation screen as in the related art. Thus, it is possible to easily and rapidly confirm the entire state of the plant 100, and to reduce wrong recognition and an erroneous operation.

Figure 7:
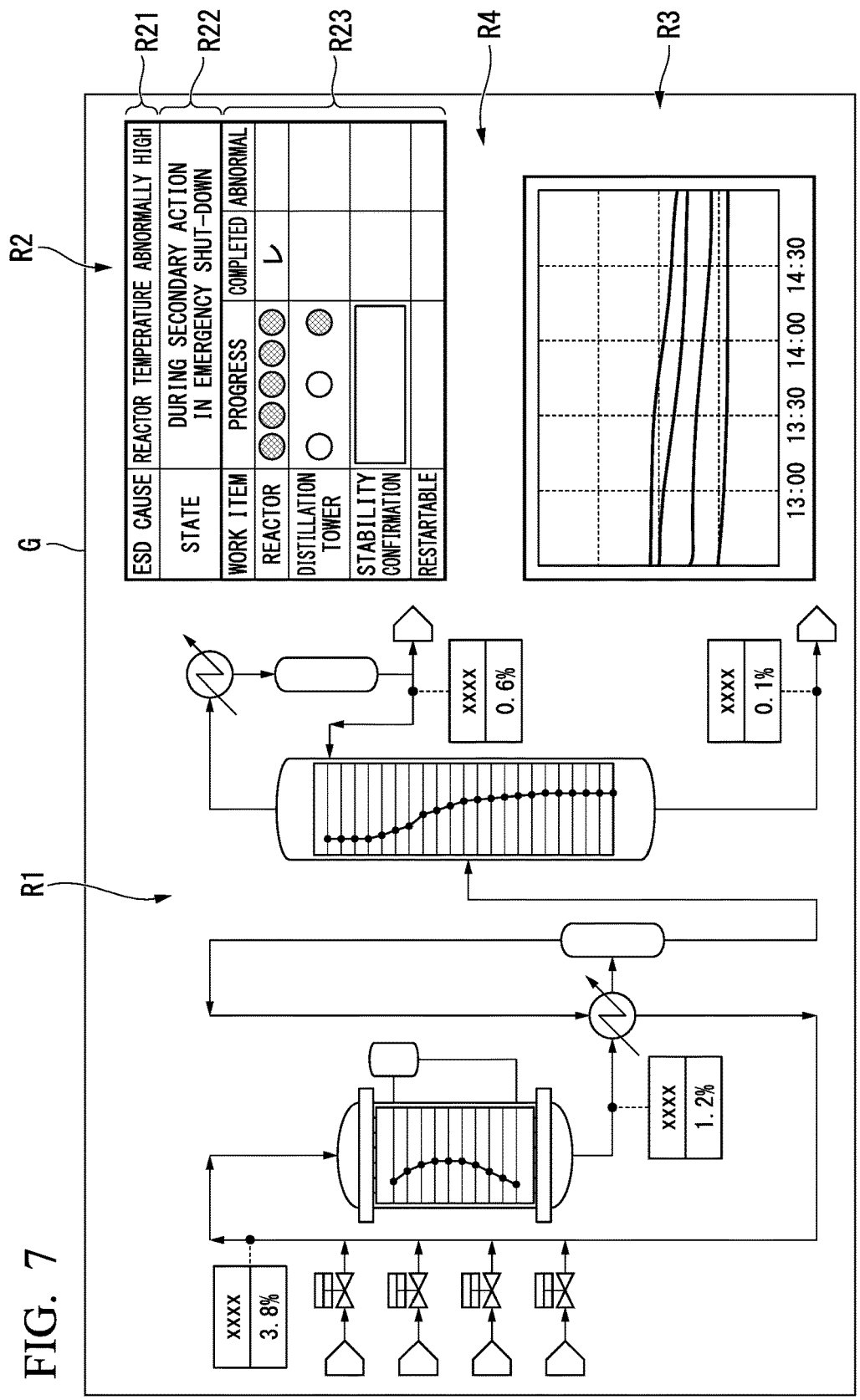
FIG. 7 is a diagram illustrating a method for confirming a work progress on an emergency shut-down screen in an embodiment of the invention.

Subsequently, the operator confirms a work progress of a secondary action with reference to the monitoring result display region R2 provided in the emergency shut-down screen G (step S23). For example, as shown in FIG. 7, the operator confirms the work progress with reference to change in color (or brightness) of a circle in a section of "process" provided in the work progress display region R23 of the monitoring result display region R2, the presence or absence of a check mark in a section of "completed", or the like. FIG. 7 is a diagram illustrating a method for confirming a work progress on an emergency shut-down screen in an embodiment of the invention. In this way, by displaying the work progress of the secondary action using a large amount of information (change in colors of circles, or the presence or absence of check marks), it is possible to reduce the workload of an operator, to thereby reduce wrong recognition and an erroneous operation.

If the secondary action is completed, stability confirmation of the entirety of the plant 100 is performed by the work progress monitoring logic 24b of the safety control station 20. Specifically, a process of confirming that the entire state of the plant 100 is in a stable state (a state where an abnormality of a device or other disturbances do not occur and an unstable behavior is not shown) for a predetermined time is performed. The operator performs the stability confirmation of the entirety of the plant 100 with reference to the work progress display region R23 of the monitoring result display region R2 provided in the emergency shut-down screen G (step S24).

Figure 8:
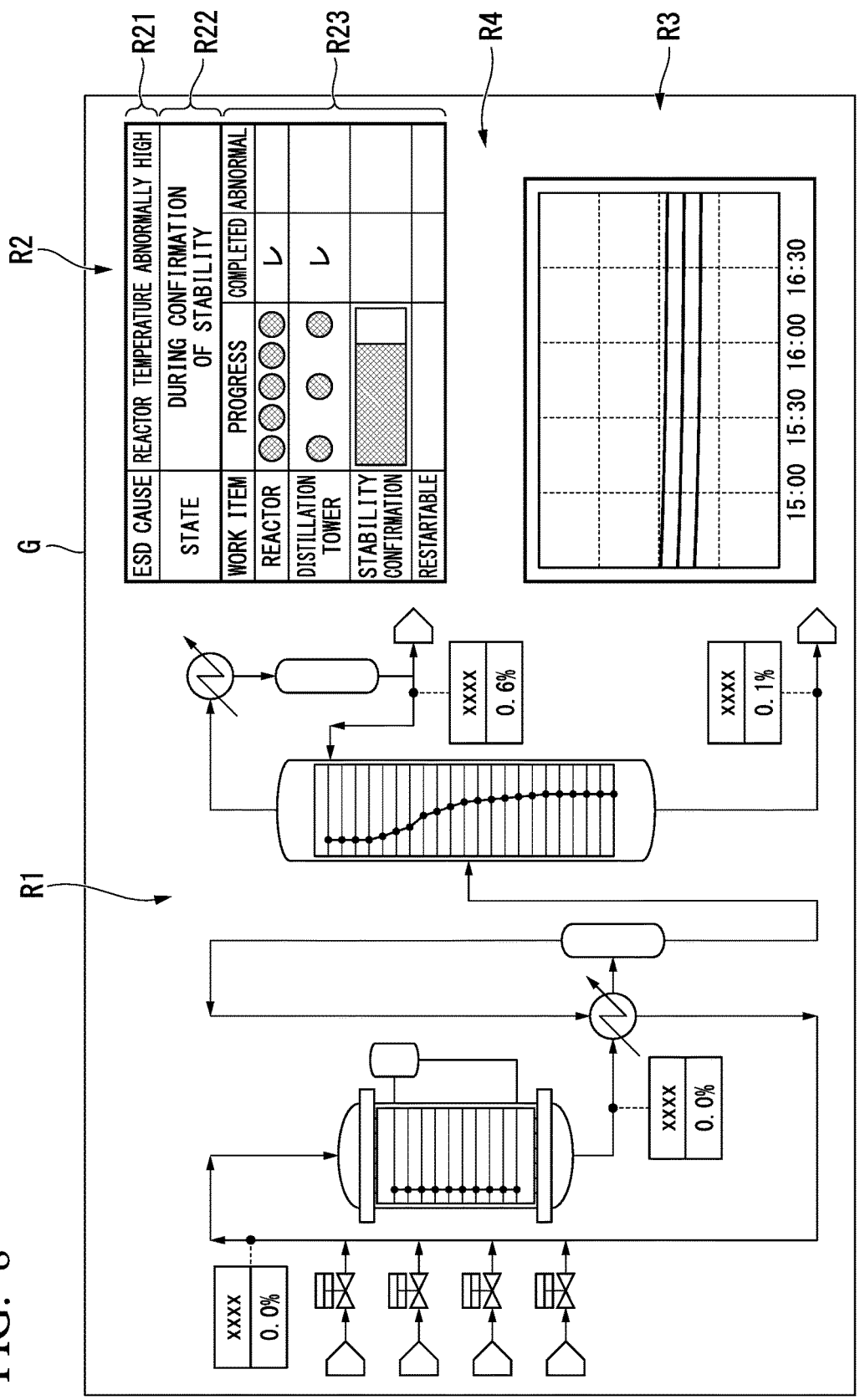
FIG. 8 is a diagram illustrating a method for performing stability confirmation on an emergency shut-down screen in an embodiment of the invention.

For example, as shown in FIG. 8, the operator confirms that the entire state of the plant 100 is stabilized until a progress bar in a section of "progress" of the "stability confirmation" displayed as the "work item" provided in the work progress display region R23 of the monitoring result display region R2 reaches a completed state and a check mark is given in the section of "completed". FIG. 8 is a diagram illustrating a method for performing stability confirmation on an emergency shut-down screen in an embodiment of the invention.

Figure 9:
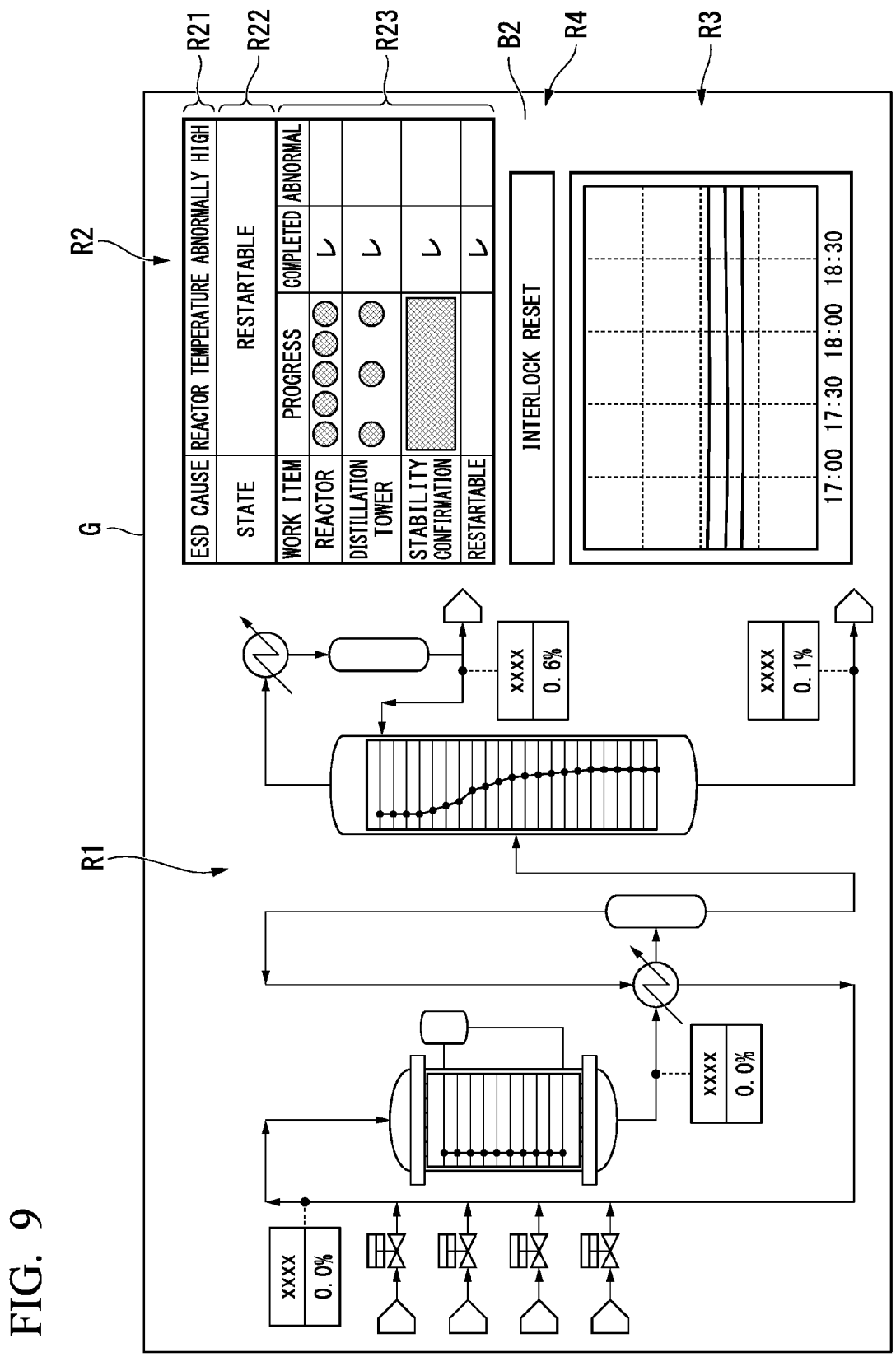
FIG. 9 is a diagram showing an example of an interlock reset button displayed on an emergency shut-down screen in an embodiment of the invention.

If the stability confirmation is completed, allowance of interlock resetting is performed by the work progress monitoring logic 24b of the safety control station 20. A signal indicating the allowance of the interlock resetting (allowance signal) is transmitted to the manipulation monitoring terminal 30 from the safety control station 20 through the network N. If the allowance signal from the safety control station 20 is received by the manipulation monitoring terminal 30, as shown in FIG. 9, an interlock reset button B2 (release button) is displayed in the interlock reset button display region R4 of the emergency shut-down screen G. FIG. 9 is a diagram showing an example of an interlock reset button displayed on an emergency shut-down screen in an embodiment of the invention.

If the operator performs a manipulation of pressing the interlock reset button B2 displayed on the emergency shut-down screen G (step S25), a signal indicating the manipulation is transmitted to the safety control station 20 from the manipulation monitoring terminal 30 through the network N. If this signal is received in the safety control station 20, for example, a shut-off state of the emergency shut-off valve 151 is released. In this way, by displaying the interlock reset button B2 on the emergency shut-down screen G after all the work items relating to the secondary action are completed, it is possible to reduce a workload of an operator to prevent an erroneous operation, and to enhance safety.

Figure 10:
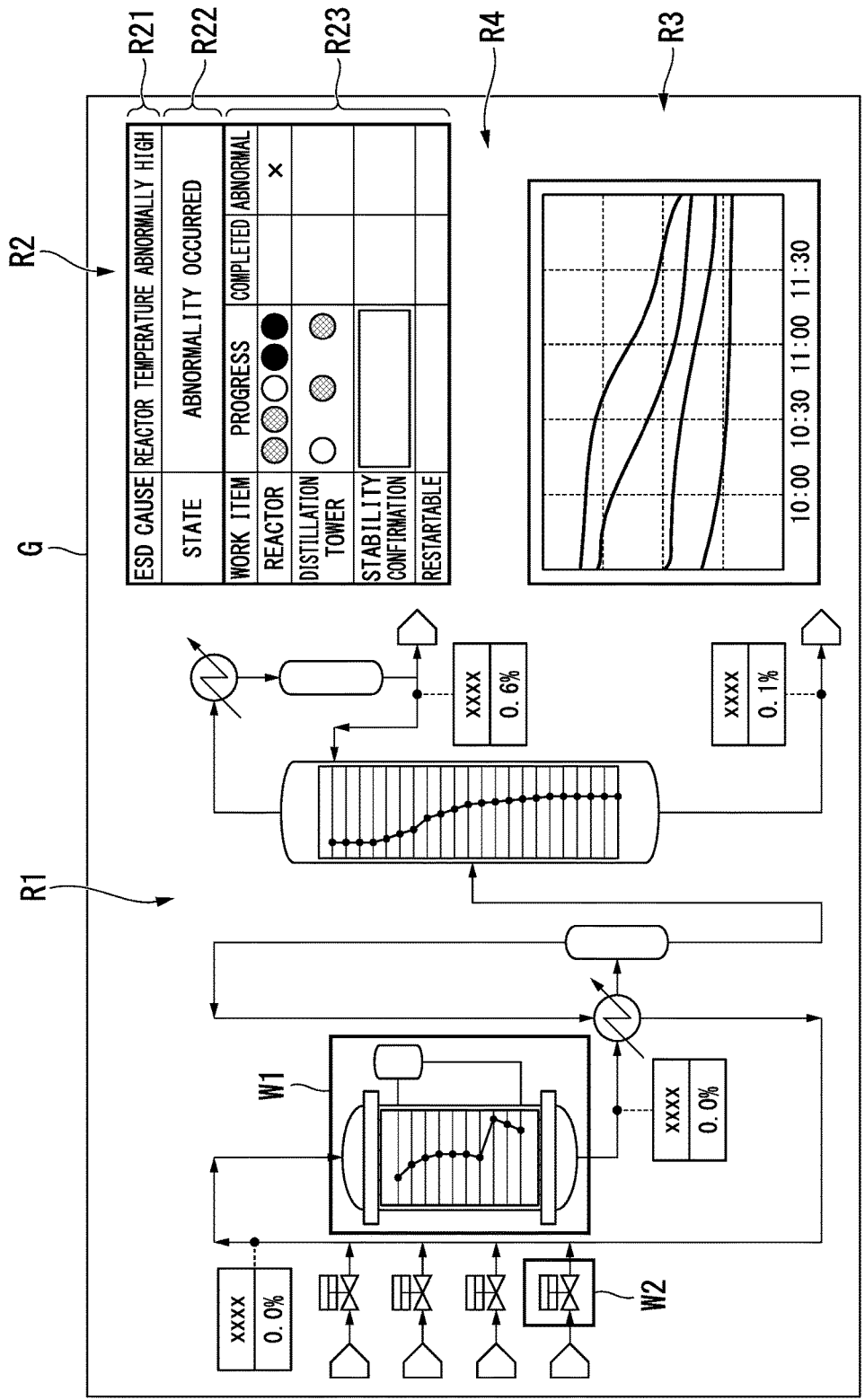
FIG. 10 is a diagram showing an example of display details of an emergency shut-down screen in a case where an abnormality occurs during working after emergency shut-down of a plant in an embodiment of the invention.

In a case where a certain abnormality (device failure, abnormal reaction, liquid leakage, or the like) occurs during work after emergency shut-down of the plant 100, a place where the abnormality occurs is notified to the manipulation monitoring terminal 30 from the plant state monitoring logic 24a of the safety control station 20. If the notification is received, as shown in FIG. 10, the manipulation monitoring terminal 30 performs a display process of surrounding devices where abnormalities occur using red frames W1 and W2, among devices displayed in the process flow diagram display region R1 provided in the emergency shut-down screen G, for example. Further, for example, the manipulation monitoring terminal 30 also performs a display process of displaying a character string "abnormality occurred" indicating that an abnormality occurs, and a display process of changing a color of a progress situations displayed in the work progress display region R23 and displaying a sign "x" in a section of "abnormal" in the state display region R22 provided in the emergency shut-down screen G.

FIG. 10 is a diagram showing an example of display details of an emergency shut-down screen in a case where an abnormality occurs during work after emergency shut-down of a plant, in an embodiment of the invention. In this way, in a case where an abnormality occurs during work after emergency shut-down of a plant, by changing the display of the emergency shut-down screen G, even when a trouble causing failure in work occurs, it is possible to rapidly determine the trouble for countermeasure, and to reduce the working time until the plant 100 is repaired.

As described above, in this embodiment, a state of the plant after emergency shut-down of the plant 100 is monitored by the plant state monitoring logic 24a of the safety control station 20, a work progress after emergency shut-down of the plant 100 is monitored by the work progress monitoring logic 24b of the safety control station 20, and the emergency shut-down screen G including monitoring results of the plant state monitoring logic 24a and the work progress monitoring logic 24b are displayed on the manipulation monitoring terminal 30. An operator of the plant 100 can easily and rapidly determine the state of the plant after emergency shut-down of the plant 100 and a work progress thereof only by referring to the emergency shut-down screen G, and thus, it is possible to reduce a workload of the operator after emergency shut-down of the plant 100. As a result, it is possible to reduce wrong recognition and an erroneous operation, and to reduce the time necessary for restarting the plant 100.

Hereinbefore, the monitoring control system and the work support method according to the embodiments of the invention have been described, but the invention is not limited to the above-described embodiments, and modifications may be freely made in the scope of the invention. For example, in the embodiments, the manipulation monitoring target is the entirety of the plant 100, but the target may be narrowed to an important place as necessary. Further, in the embodiments, the state of the plant 100 after emergency shut-down is used as a target, but the invention may be applied to planned start after periodic repairs, change in operation conditions, or planned shut-down before periodic repairs.

Further, in the above-described embodiments, an example in which the emergency shut-down screen G including monitoring results of the plant state monitoring logic 24a and the work progress monitoring logic 24b provided in the safety control station 20 is displayed on the manipulation monitoring terminal 30 is shown. However, for example, in a case where a display device is provided in the control station 10 or the safety control station 20, the emergency shut-down screen G may be displayed on the display device.

As used herein, the following directional terms "forward, rearward, above, downward, right, left, vertical, horizontal, below, transverse, row and column" as well as any other similar directional terms refer to those directions of a device equipped with the present invention. Accordingly, these terms, as utilized to describe the present invention should be interpreted relative to a device equipped with the present invention.

The terms of degree such as "substantially," "about," and "approximately" as used herein mean a reasonable amount of deviation of the modified term such that the end result is not significantly changed. For example, these terms can be construed as including a deviation of at least ±5 percent of the modified term if this deviation would not negate the meaning of the word it modifies.

The term "configured" is used to describe a component, unit or part of a device includes hardware and/or software that is constructed and/or programmed to perform the desired function.

Moreover, terms that are expressed as "means-plus function" in the claims should include any structure that can be utilized to perform the function of that part of the present invention.

The term "unit" or "part" is used to describe a component, unit or part of a hardware and/or software that is constructed and/or programmed to perform the desired function. Typical examples of the hardware may include, but are not limited to, a device and a circuit.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:
1. A monitoring control system comprising:
a control device that includes an action execution unit that executes an action with respect to a plant after emergency shut-down of the plant, and controls devices provided in the plant based on process information obtained from the devices provided in the plant;
a safety control device that includes a safety control unit that performs the emergency shut-down of the plant in a case where an abnormality occurs in the plant, a state monitoring unit that monitors a state of the plant after the emergency shut-down of the plant, and a work progress monitoring unit that monitors a work progress after the emergency shut-down of the plant according to an execution situation of the action execution unit of the control device and that allows release of the emergency shut-down of the plant in a case where the work progress monitoring unit determines that work is completed; and
a display device that displays, in a case where the emergency shut-down of the plant is performed by the safety control device, an emergency shut-down screen including a monitoring result of the state monitoring unit and a monitoring result of the work progress monitoring unit.

2. The monitoring control system according to claim 1, wherein
the state monitoring unit determines a cause of the emergency shut-down of the plant, and
the display device displays the cause determined by the state monitoring unit on the emergency shut-down screen.

3. The monitoring control system according to claim 1, wherein
the safety control device collects process information from devices provided in the plant, determines whether or not an abnormality occurs in the plant based on the collected information, and performs emergency shut-down of the plant by outputting a trigger signal for the emergency shut-down of the plant when determining that an abnormality occurs in the plant, and
the state monitoring unit starts its operation when receiving the trigger signal from the safety control station, and monitors a state of the plant after the emergency shut-down of the plant using information collected in the safety control device.

4. The monitoring control system according to claim 3, wherein the control device starts its operation when receiving the trigger signal from the safety control station, performs an operation of controlling the device provided in the plant to enter a stable state that is predetermined by changing operating conditions of the device, and outputs information regarding the operation to the work progress monitoring unit.

5. The monitoring control system according to claim 4, wherein
the work progress monitoring unit starts its operation when receiving the trigger signal from the safety control station, determines whether or not the device is being in the stable state for a predetermined time based on the information regarding the operation from the control device, and outputs an allowance signal indicating allowance of interlock resetting of the plant to the display device when determining that the device is being in the stable state for the predetermined time, and
the display device displays a release button for releasing the emergency shut-down of the plant on the emergency shut-down screen when receiving the allowance signal.

6. The monitoring control system according to claim 1, wherein
the state monitoring unit monitors a preset important monitoring device to determine whether the device is normal or abnormal, and notifies a place where the abnormality occurs to the display device when determining that the device is abnormal, and
the display device changes a display of at least one of the monitoring result of the state monitoring unit and the monitoring result of the work progress monitoring unit in the emergency shut-down screen when an abnormality occurrence place is notified to the display device from the state monitoring unit.

7. The monitoring control system according to claim 1, wherein
the state monitoring unit detects an initially obtained cause among plural causes which are considered as causes of the emergency shut-down of the plant as a main cause of the emergency shut-down of the plant, and notifies the main cause to the display device, and
the display device displays the main cause determined by the state monitoring unit on the emergency shut-down screen.

8. The monitoring control system according to claim 1, wherein the display device displays a process flow diagram in which devices necessary for performing work after the emergency shut-down of the plant are collectively shown, among devices provided in the plant, on the emergency shut-down screen.

9. The monitoring control system according to claim 8, wherein the display device displays time series information obtained from devices included in the process flow diagram, among devices for which monitoring is necessary after the emergency shut-down of the plant in an overlapping manner on the process flow diagram.

10. The monitoring control system according to claim 1, wherein the display device displays time series information obtained from devices for which monitoring is necessary after the emergency shut-down of the plant on the emergency shut-down screen.

11. The monitoring control system according to claim 1, wherein in a case where the work progress monitoring unit allows the release of the emergency shut-down of the plant, the display device displays a release button that releases the emergency shut-down of the plant on the emergency shut-down screen.

12. The monitoring control system according to claim 1, wherein,
in a case where an abnormality of a device provided in the plant occurs after the emergency shut-down of the plant, the state monitoring unit notifies the display device of a place where the abnormality occurs, and
the display device changes the display of at least one of the monitoring result of the state monitoring unit and the monitoring result of the work progress monitoring unit on the emergency shut-down screen according to notification details from the state monitoring unit.

13. The monitoring control system according to claim 1, wherein the display device displays a link button to the emergency shut-down screen on a plant operation screen in a case where the emergency shut-down of the plant is performed by the safety control device, and displays the emergency shut-down screen when a manipulation with respect to the link button is performed.

14. The monitoring control system according to claim 1, wherein the emergency shut-down of the plant comprises reliably stopping the plant in a safe state in order to prevent an explosion accident, an injury accident, or environmental contamination before the explosion accident, the injury accident or the environmental contamination, respectively, occurs.

15. A work support method for supporting work performed after emergency shut-down of a plant, the work support method comprising:
monitoring, by a safety control device, a state of the plant after the emergency shut-down of the plant;
monitoring, by the safety control device, a work progress after the emergency shut-down of the plant according to an execution situation of an action execution unit of a control device, the control device controlling devices provided in the plant based on process information obtained from the devices provided in the plant, the action execution unit executing an action with respect to the plant after the emergency shut-down of the plant;
displaying, on a display device, an emergency shut-down screen including a monitoring result of monitoring the state of the plant and monitoring the work progress; and allowing, by the safety control device, release of the emergency shut-down of the plant in a case where the safety control device determines that work is completed.

16. The work support method according to claim 15, wherein monitoring the state of the plant comprises determining a cause of the emergency shut-down of the plant; and the displaying comprises displaying the cause on the emergency shut-down screen.

17. The work support method according to claim 15, wherein the displaying comprises:

displaying a process flow diagram in which devices necessary for performing work after the emergency shut-down of the plant are collectively shown, among devices provided in the plant, on the emergency shut-down screen.

18. The work support method according to claim 17, wherein the displaying comprises:

displaying time series information obtained from devices included in the process flow diagram, among devices for which monitoring is necessary after the emergency shut-down of the plant in an overlapping manner on the process flow diagram.

19. The work support method according to claim 15, wherein the displaying comprises:

displaying time series information obtained from devices for which monitoring is necessary after the emergency shut-down of the plant on the emergency shut-down screen.

20. The work support method according to claim 15, further comprising:

in a case where the safety control device determines that work is completed, displaying a release button for releasing the emergency shut-down of the plant on the emergency shut-down screen.

* * * * *